United States Patent
Chew

(10) Patent No.: US 11,334,301 B2
(45) Date of Patent: May 17, 2022

(54) INFORMATION-PROCESSING DEVICE EXECUTING RENAMING PROCESS TO MODIFY PRINT QUEUE NAME

(71) Applicant: BROTHER KOGYO KABUSHIKI KAISHA, Nagoya (JP)

(72) Inventor: Po Chun Chew, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/001,101

(22) Filed: Aug. 24, 2020

(65) Prior Publication Data
US 2021/0096792 A1 Apr. 1, 2021

(30) Foreign Application Priority Data
Sep. 30, 2019 (JP) .............................. JP2019-179102

(51) Int. Cl.
*G06F 3/12* (2006.01)
(52) U.S. Cl.
CPC .......... *G06F 3/1231* (2013.01); *G06F 3/1207* (2013.01); *G06F 3/1267* (2013.01)
(58) Field of Classification Search
CPC .... G06F 3/1231; G06F 3/1236; G06F 3/1254; G06F 9/4413
USPC ...... 358/1.15, 1.9, 1.16; 399/13; 710/10, 19, 710/62, 64
See application file for complete search history.

(56) References Cited

U.S. PATENT DOCUMENTS

| | | | | |
|---|---|---|---|---|
| 6,498,656 | B1* | 12/2002 | Mastie | G06F 3/1259 358/1.13 |
| 6,697,073 | B1 | 2/2004 | Kadota | |
| 6,809,830 | B1* | 10/2004 | Lafky | G06F 3/1204 358/1.13 |
| 2006/0221368 | A1* | 10/2006 | Higuchi | G06F 3/1204 358/1.13 |
| 2007/0005845 | A1* | 1/2007 | Abe | G06F 3/1286 710/62 |
| 2011/0075205 | A1* | 3/2011 | Oomura | G06F 3/126 358/1.15 |

FOREIGN PATENT DOCUMENTS

JP 2000-242454 A 9/2000

\* cited by examiner

*Primary Examiner* — Jamares Q Washington
(74) *Attorney, Agent, or Firm* — Kenealy Vaidya LLP

(57) ABSTRACT

In an information-processing device, the controller executes a detection process, after first print queue information is registered, to detect that second print queue information is registered on a memory. The first print queue information correlates first print queue name, first print settings, and a first port ID with one another. The first print queue name is based on a first printer name of a first printer connected to a first port. The first port ID identifies the first port. The second print queue information correlates second print queue name, second print settings, and a second port ID with one another. The second print queue name is based on the first printer name and different from the first print queue name. The controller executes a renaming process, in response to detection of the second print queue registered, to modify the second print queue name in the second print queue information.

36 Claims, 8 Drawing Sheets

INFORMATION-PROCESSING DEVICE EXECUTING RENAMING PROCESS TO MODIFY PRINT QUEUE NAME

CROSS REFERENCE TO RELATED APPLICATION

This application claims priority from Japanese Patent Application No. 2019-179102 filed Sep. 30, 2019. The entire content of the priority application is incorporated herein by reference.

TECHNICAL FIELD

The present invention relates to a program executed by an information-processing device having an OS generating print queue information, and the information-processing device.

BACKGROUND

A conventional printing system has a plurality of printers connected to a computer. When executing printing, one of the plurality of printers to be used is selected. The computer registers a list of port names. The port name includes the model name and serial number of the printer.

SUMMARY

Some operating systems (OS) installed on information-processing devices such as personal computers possess a function for generating a print queue name for a printer connected to a port of the information-processing device. The print queue name is generated based on the model name of the printer. The operating systems attach the print queue name to print queue information and record the print queue information in the registry. Occasionally, these operating systems may record in the registry one set of print queue information having the model name of the printer as the print queue name, and another set of print queue information having a print queue name formed by appending the text "copy" or the like to the model name. As a consequence, the user may select unintended print queue information when issuing a print command to the information-processing device.

In view of the foregoing, it is an object of the present disclosure to provide a technique for modifying the print queue name included in the print queue information to reduce the likelihood of a user selecting incorrect print queue information.

In order to attain the above and other objects, the disclosure provides a non-transitory computer readable storage medium storing a set of program instructions installed on and executed by an information-processing device having a display, a plurality of physical ports including a first physical port, a controller and a memory storing an OS. The OS is configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another. The memory is further configured to store an application program for executing: displaying on the display a selection screen having one or more registered print queue names to be selected; and, in response to selection of a print queue name, outputting a print command for specifying print queue information of the selected print queue name to the OS. The OS is configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name. The set of program instructions includes: executing a detection process, after first print queue information is registered, to detect that second print queue information is registered on the memory, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name being based on the first printer name and different from the first print queue name; and executing a renaming process, in response to detection of the second print queue registered, to modify the second print queue name in the second print queue information.

According to another aspect, the disclosure provides a non-transitory computer readable storage medium storing a set of program instructions installed on and executed by an information-processing device having a display, a plurality of physical ports including a first physical port, a controller and a memory storing an OS. The OS is configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another. The memory is further configured to store an application program for executing: displaying on the display a selection screen having one or more registered print queue names to be selected; and, in response to selection of a print queue name, outputting a print command for specifying print queue information of the selected print queue name to the OS. The OS is configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name. The set of program instructions includes: executing a settings reception process to receive operation settings; and executing a renaming process, after first print queue information and second print queue information are registered, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name including at least part of the first print queue name, the renaming process being to modify the second print queue name.

According to still another aspect, the disclosure provides an information-processing device. The information-processing device includes a display, a plurality of physical ports, a memory, and a controller. The plurality of physical ports includes a first physical port. The memory stores an OS. The OS is configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS. The OS is configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name. The controller is configured to execute: a detection process, after first print queue information is registered, to detect that second print queue information is registered on the memory, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name being based on the first printer name and different from the first print queue name; and a renaming process, in response to detection of the second print queue registered, to modify the second print queue name in the second print queue information.

According to still another aspect, the disclosure provides an information-processing device. The information-processing device includes a display, a plurality of physical ports, a memory, and a controller. The plurality of physical ports includes a first physical port. The memory stores an OS. The OS is configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS. The OS is configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name. The controller is configured to execute: a settings reception process to receive operation settings; and a renaming process, after first print queue information and second print queue information are registered, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name including at least part of the first print queue name, the renaming process being to modify the second print queue name.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, an embodiment of the present invention will be described. The embodiment described below is merely an example of the present invention, and it would be apparent to those skilled in the art that the embodiment of the present invention may be modified as appropriate without departing from the scope of the invention. For example, the order for executing steps in the processes described below may be modified as needed without departing from the scope of the invention. Alternatively, some of the steps described below may be omitted as needed without departing from the scope of the invention.

Figure 1:
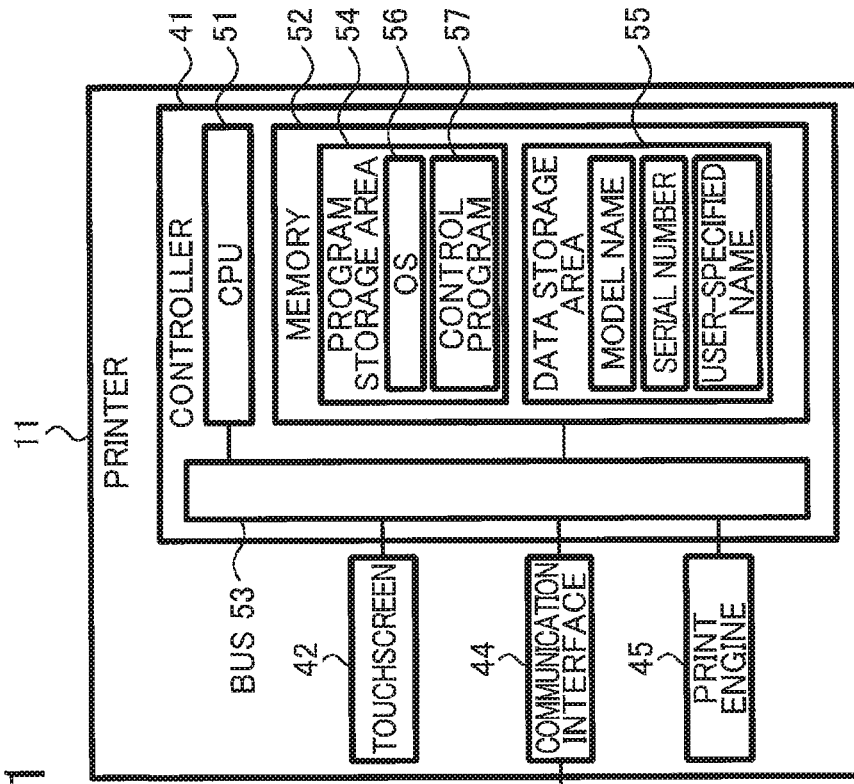
FIG. 1 is a functional block diagram illustrating an information-processing device according to an embodiment and a printer.
Figure 1:
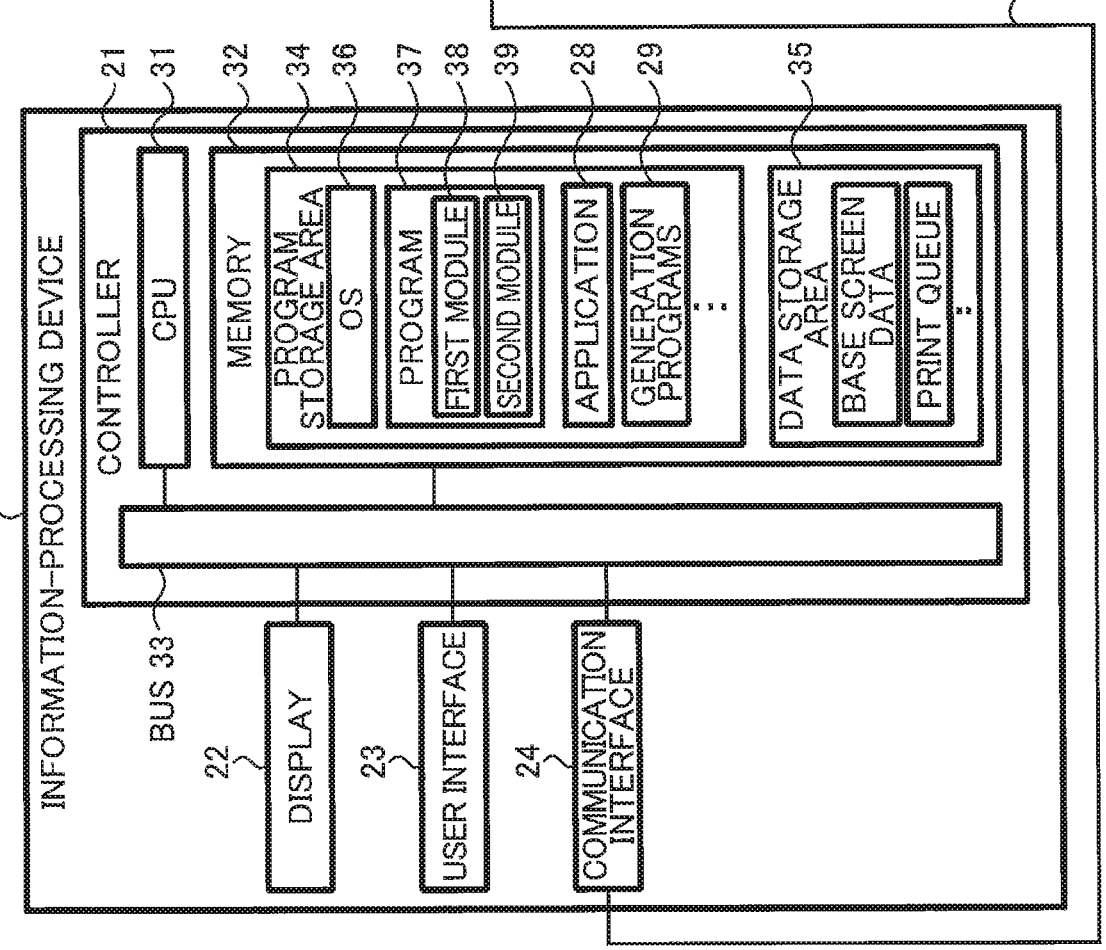

The embodiment will describe a program 37 that is installed on an information-processing device 10 shown in FIG. 1. The information-processing device 10 is a personal computer, for example. The information-processing device 10 is connected to one or more printers 11 by one or more USB cables 13 so as to be capable of communicating with the printer 11. When a print command is received from the user, the information-processing device 10 displays a selection screen on a display 22. The selection screen enables the user to select the printer 11. When the user selects the printer 11 in the selection screen, the information-processing device 10 issues a command to the printer 11 to execute a printing operation. The program 37 implements a renaming process for changing the print queue name displayed in an icon or other object in the selection screen in order to facilitate the user in making a selection. This process will be described later in greater detail. In the following description, a personal computer will be used as an example of the information-processing device 10.

The printer 11 is provided with a controller 41, a touchscreen 42, a communication interface 44, and a print engine 45.

The touchscreen 42 has a display panel, and a clear touch-sensor film superposed over the display panel. The touch-sensor film outputs position information specifying positions on the display panel that have been touched by the user. Position information outputted from the touch-sensor film is inputted into the controller 41. Based on the position information inputted from the touch-sensor film, the controller 41 can determine whether an icon or the like displayed on the display panel was selected.

Figure 2:
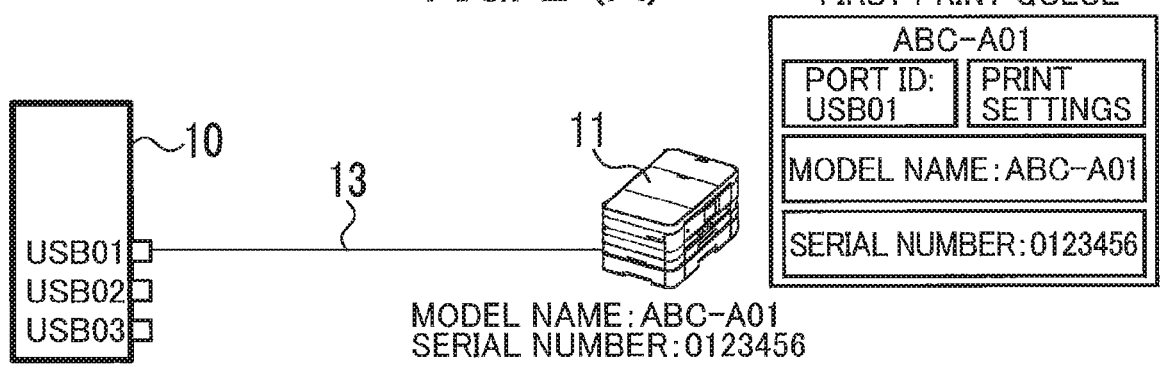
FIGS. 2(A)-2(E) are explanation diagrams illustrating relations between connection states of printers to the information-processing device and print queue names of print queues registered in a memory of the information-processing device.
Figure 2:
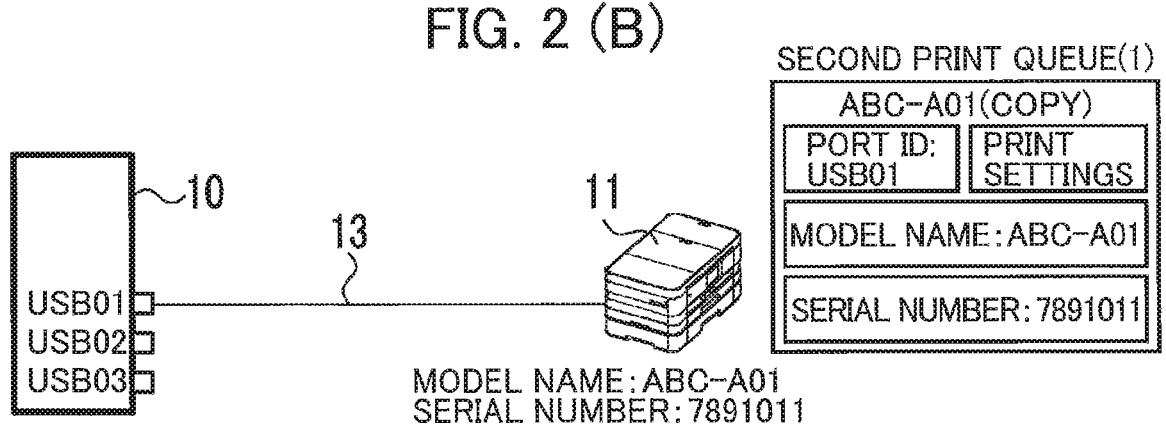
Figure 2:
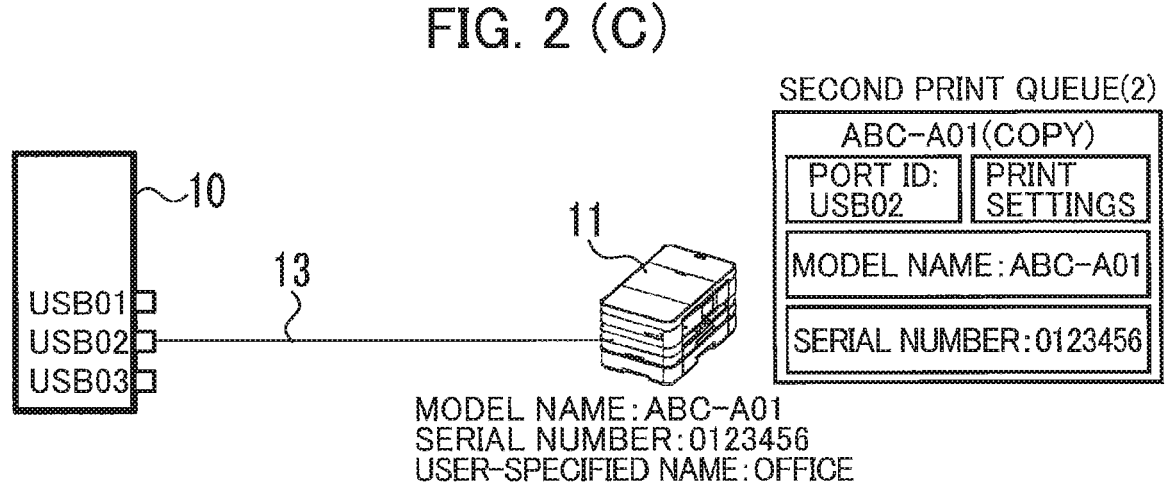
Figure 2:
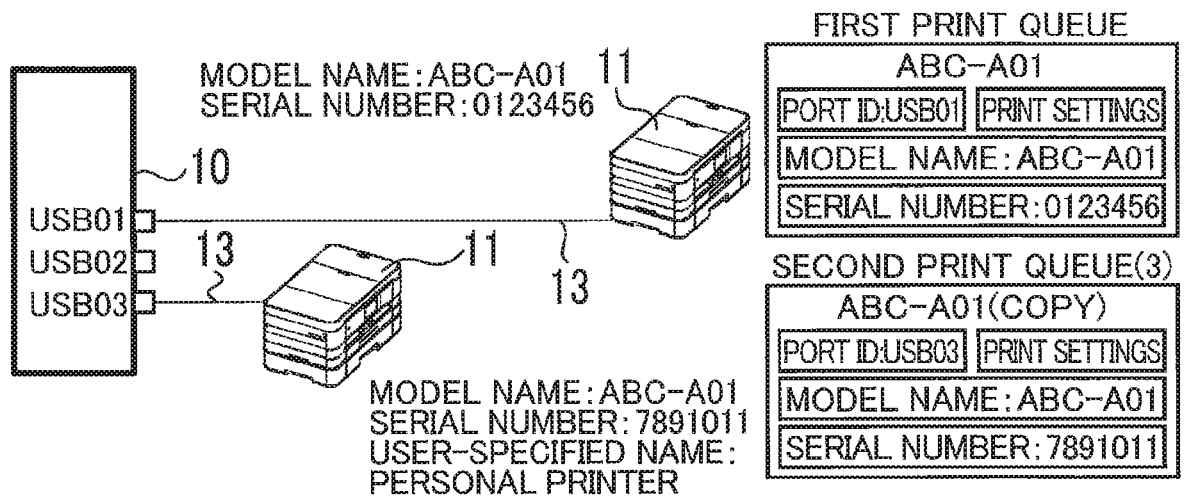
Figure 2:
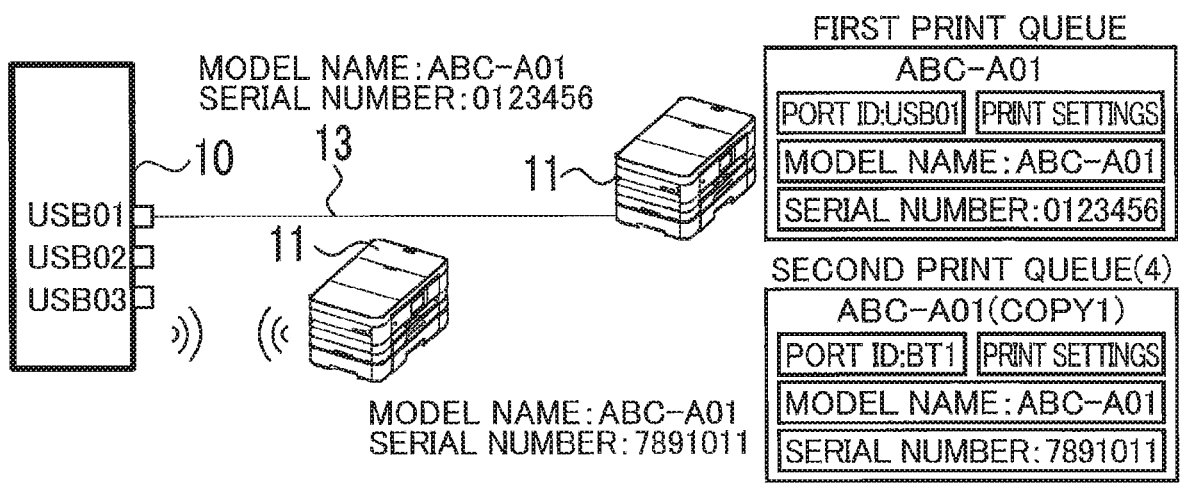

The communication interface 44 includes one or a plurality of communication interfaces. One of the communication interfaces confirms to one communication standard. For example, the communication interface 44 includes a communication interface conforming to the USB (Universal Serial Bus; registered trademark) communication standard. The printer 11 is connected to the information-processing device 10 by a USB cable 13 (see FIG. 2) and communicates with the information-processing device 10 using the communication interface included in the communication interface 44 conforming to the USB standard. An example of the USB standard is USB 2.0.

The communication interface 44 may also include a communication interface conforming to the wired or wireless LAN communication standard. Thus, the printer 11 can communicate with the information-processing device 10 using the communication interface conforming to the wired or wireless LAN communication standard. An example of the wireless LAN communication standard is the IEEE 802.11 standard.

The communication interface 44 may also have a communication interface conforming to the Bluetooth (registered trademark) communication standard. Thus, the printer 11 can communicate with the information-processing device 10 using the communication interface conforming to the Bluetooth communication standard. An example of the Bluetooth communication standard is Bluetooth BR/EDR (Basic Rate/Enhanced Data Rate).

The print engine 45 possesses a function for printing images on sheets by ejecting ink droplets onto the sheets. Alternatively, the print engine 45 may have a function for printing images on sheets by transferring toner onto the sheets. Alternatively, the print engine 45 may have a function for forming images on cloth or the like through embroidery. Alternatively, the print engine 45 may have a function for forming images on objects with a laser beam. Alternatively, the print engine 45 may have a function for forming images using structural colors formed through organized microfibrillation (OM). Hence, the printer 11 may be any of various types of printers.

The controller 41 is provided with a central processing unit (CPU) 51, a memory 52, and a bus 53. The CPU 51 and the memory 52, as well as the touchscreen 42, the communication interface 44, and the print engine 45 described above, are connected to the bus 53. Hence, the CPU 51 can store information and data in the memory 52 and can read information and data from the memory 52. The CPU 51 can also display screens on the display panel of the touchscreen 42 by inputting image data into the display panel, and can acquire information and data inputted into the touch sensor of the touchscreen 42. The CPU 51 can also transmit information and data to the information-processing device 10 through the communication interface 44 and can acquire information and data from the information-processing device 10 through the communication interface 44. The CPU 51 can also control the print engine 45 to execute a printing operation by inputting print data into the print engine 45. The CPU 51 executes a plurality of programs, including an OS 56 and a control program 57 described later, in a pseudo-parallel manner through multitasking.

The memory 52 is configured of ROM, RAM, a hard disk drive, a portable storage medium such as USB memory, EEPROM, or a buffer provided in the CPU 51. The memory 52 may be any storage medium that can be read by a computer. A computer-readable storage medium is a non-transitory medium. In addition to the above examples, non-transitory media include CD-ROM and DVD-ROM. A non-transitory medium is also a tangible medium. This description also applies to a memory 32 described later.

The memory 52 has a program storage area 54 that stores programs, and a data storage area 55 that stores data and the like required for executing the programs. The program storage area 54 stores an operating system (OS) 56 and a control program 57. The control program 57 directs the CPU 51 to implement a printing process for controlling the print engine 45 to print by inputting print data into the print engine 45.

The data storage area 55 stores a model name, a serial number, and a user-specified name. The model name and the serial number are stored in the data storage area 55 when the printer 11 is manufactured, for example. The user-specified name is a name that the user inputs into the printer 11 through the touchscreen 42 and that the control program 57 stores in the data storage area 55. Hence, the user-specified name is a nickname that the user applies to the printer 11 in order to differentiate individual printers 11 from among a plurality of printers 11. The user-specified name in the example of FIG. 2(C) is "Office." In the example of FIG. 2(D), the user-specified name is "Personal Printer." The model name is an example of the printer name.

The information-processing device 10 is provided with a controller 21, a display 22, a user interface 23, and a communication interface 24. The user interface 23 includes a mouse, keyboard, microphone, and the like. When the information-processing device 10 is a tablet computer or other mobile device, the user interface 23 may be a clear touch-sensor film superposed over the display 22, a microphone, and the like. In other words, when the information-processing device 10 is a mobile device such as a tablet computer, the information-processing device 10 is provided with a touchscreen.

The communication interface 24 has the same configuration as the communication interface 44 described above. If the information-processing device 10 is a personal computer, the communication interface 24 includes a communication interface conforming to the USB communication standard, a communication interface conforming to the wired LAN communication standard, a communication interface conforming to the wireless LAN communication standard, and a communication interface conforming to the Bluetooth communication standard. If the information-processing device 10 is a wireless communication device, such as a tablet computer or other mobile device, the communication interface 24 has a communication interface conforming to the wireless LAN communication standard and a communication interface conforming to the Bluetooth communication standard.

The controller 21 is provided with a CPU 31, a memory 32, and a bus 33. The CPU 31 and the memory 32, as well as the user interface 23, the communication interface 24, and the display 22 described above, are connected to the bus 33. The configurations of the CPU 31, the memory 32, and the bus 33 are generally the same as the configurations of the CPU 51, the memory 52, and the bus 53 in the printer 11. The CPU 31 is an example of the computer.

The memory 32 has a program storage area 34 that stores programs, and a data storage area 35 that stores data and the like required for executing the programs. The program storage area 34 stores an OS 36, a program 37, an application 28, and one or a plurality of generation programs 29.

The OS 36 is Windows (registered trademark), macOS (registered trademark), Unix (registered trademark), or Linux (registered trademark), for example. In a case where the information-processing device 10 is a mobile device or a tablet computer, the OS 36 may be Windows Phone (registered trademark), iOS (registered trademark), Android (registered trademark), or BlackBerry OS (registered trademark).

The OS 36 has a Plug-and-Play function (hereinafter referred to as the PnP function). The PnP function detects when a device is connected to and capable of communicating with the information-processing device 10, and sets up a driver on the information-processing device 10 that supports the type of the device. When the OS 36 detects that the printer 11 has been connected to a USB port as a device, the OS 36 sets up a generation program 29 for generating print data to be transmitted to the printer 11. Specifically, the OS 36 generates a print queue in the form of a folder and stores this print queue in the data storage area 35 of the memory 32. A storage area in the data storage area 35 in which the print queue is stored is known as the registry. Thus, the OS 36 records the print queue in the registry. The OS 36 also stores the model name of the printer 11, the port ID, and print settings in the print queue recorded in the registry, described later in detail. Note that the OS 36 (described later) may record a print queue in the registry, not only when a printer 11 is connected to a port conforming to the USB standard, but also when a printer 11 is connected to a port conforming to the Hardcopy Cable Replacement Profile (HCRP) or the Serial Port Profile (SPP) of the Bluetooth communication protocol. The print queue is an example of the print queue information.

Ports for connecting devices are configured in the communication interface 44. These ports represent a different concept from a print queue. In the embodiment, ports configured in the communication interface 44 are treated as an example of the physical ports. A port ID identifies the physical port to which the printer 11 is connected. Port IDs may be generated by the OS 36 (described later). With a communication interface conforming to the USB standard, for example, a physical port is set for each USB port in which a USB cable 13 can be inserted. With the communication interfaces conforming to the wired and wireless LAN communication standards, a physical port is set for each LAN port in which a LAN cable can be physically inserted, or for each virtual LAN port. The LAN ports may be differentiated between wireless LAN ports and wired LAN ports. With the communication interface conforming to the Bluetooth standard, a physical port is set for each virtual Bluetooth port (hereinafter referred to as "BT port"). The information-processing device 10 may have a plurality of USB ports, a plurality of wired LAN ports, a plurality of wireless LAN ports, and a plurality of BT ports. In the examples shown in FIG. 2, the information-processing device 10 has three USB ports that are labeled USB01, USB02, and USB03. A port expansion device, such as USB hub, may be connected to one of the USB ports of the information-processing device 10. In this case, the OS 36 (described later) of the information-processing device 10 possesses a function for identifying USB ports in the port expansion device as USB ports of the information-processing device 10. The USB port, the wireless LAN port, the wired LAN port, and the BT port are examples of the physical port.

The application 28 may be a program that generates document files, a program that generates or edits drawings or other image data, a mail program that transmits and receives e-mail, and the like.

The generation program 29 generates print data based on image data received from the OS 36, the application 28, or the like and outputs this print data to the printer 11. The print data generated by the generation program 29 is data that the printer 11 can interpret and use to execute a printing operation. If the information-processing device 10 is a personal computer using Windows as the OS 36, for example, the generation program 29 is known as a printer driver. The generation program 29 may also be a supporting application provided in the OS 36 or the application 28 to support a printing function for executing printing operations on the printer 11. Some examples of this printing function are AirPrint (registered trademark), Mopria (registered trademark), and Google Cloud Print (registered trademark).

The program 37 has a first module 38, and a second module 39. The first module 38 is known as a user interface (UI) module and executes a settings reception process to receive user input. The second module 39 executes a renaming process (FIG. 4(B)) described later to rename a name of the print queue.

The program 37 also has specific port types that are specified through programming or configuration data. The program 37 modifies the print queue name of a print queue generated for ports of the specific port types. A port of the specific port types denotes a port through which the information-processing device 10 can implement two-way communication with the printer 11 for exchanging various types of information including printer information (described later). For example, if the printer 11 can perform two-way communication with the information-processing device 10 on USB ports and BT ports but cannot perform two-way communication with the information-processing device 10 on wired LAN ports and wireless LAN ports, the specific port types are USB ports and BT ports.

The data storage area 35 stores base screen data, and one or more print queues. Base screen data is data used to generate a first settings screen, a second settings screen, and a name entry screen shown respectively in FIGS. 6(A), 6(B), and 6(C). The base screen data is stored in the data storage area 35 in advance. The first settings screen, the second settings screen, and the name entry screen will be described later in detail. Note that base screen data may also be included in the program 37.

Next, processes executed by the program 37 will be described in detail. These processes include the settings reception process for receiving settings inputted by the user, and the renaming process for detecting when a print queue has been recorded in the registry and for modifying a print queue name which is a name of the recorded print queue.

The CPU 31 performs the processes described below according to instructions in the programs. In the following description, actions such as "determine," "extract," "select," "calculate," "decide," "identify," "acquire," "receive," "control," "set," and the like represent processes performed by the CPU 31. Processes performed by the CPU 31 include processes that control hardware through the OS 36. Note that the term "acquire" in this specification is used as a concept that does not necessarily require a request. In other words, a process by which the CPU 31 receives data without requesting that data is included in the concept of "the CPU 31 acquires data." The term "data" described herein is expressed as bit strings that can be read by a computer. Data of different formats are treated as the same data when the content of the data is essentially the same. The same holds true for "information" in this specification. An "instruction," a "response," a "request," or the like is processed by communicating information indicating the "instruction," the "response," or the "request." The terms "instruction," "response," and "request" may also be used to describe information indicating an "instruction," a "response," and a "request."

A process executed by the CPU 31 according to instructions described in a program may be described using abbreviated expressions, such as "the CPU 31 executes," "the controller 21 executes," and "the program 37 executes."

Further, a process performed by the CPU 31 to determine whether information A indicates circumstance B may be described conceptually as "determining whether circumstance B based on information A." A process in which the CPU 31 determines whether information A indicates circumstance B or circumstance C may be described conceptually as "determining whether circumstance B or circumstance C based on information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, "data" and "information" are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between "data" and "information" is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrase "in response to" in this specification indicates that the process specified before the phrase is to be executed when the condition specified after the phrase has been met. Note that the timing at which the process is executed should be after the condition has been met, but need not be immediately after the condition is met.

First, a process in which the information-processing device 10 receives user input and transmits print data to the printer 11 will be briefly described. The application 28 displays a Print icon on the display 22 for receiving a command from the user to execute a print. When the application 28 receives a print command through the Print icon, the application 28 displays a selection screen on the display 22 via the OS 36. The selection screen has icons with names of the print queues. The application 28 receives a user selection for one of these icons.

Based on the selected icon, the application 28 outputs to the OS 36 a print command for instructing transmission of print data to the corresponding printer 11. Upon receiving the print command, the OS 36 identifies the print queue having the same print queue name as the text in the selected icon, and displays a print settings screen on the display 22 that includes the print settings stored in the identified print queue. Print settings include information on the paper size, an option for printing in monochrome or color, and margin settings, for example. The OS 36 receives specific setting via the print settings screen.

The application 28 transfers the print settings, and image data or a path specifying the location of the image data received via the OS 36 to the generation program 29 having the same name as the model name stored in the print queue, instructing the generation program 29 to generate print data. The application 28 or the OS 36 may also receive print settings inputted by the user and may transfer the print settings stored in the print queue to the generation program 29 by editing the print settings based on the settings received from the user. The generation program 29 generates print data based on the print settings stored in the print queue and the image data received from the application 28 or the OS 36, and transfers the generated print data or a path specifying the location of the print data to the OS 36. The OS 36 transmits a print execution command including the print data received from the generation program 29 to the printer 11 via the port specified by the port ID stored in the print queue. Note that the process executed by the application 28, the OS 36, and the generation program 29 described above is just one example in which the information-processing device 10 transmits print data to the printer 11.

Next, the settings reception process executed by the program 37 to receive settings for modifying print queue names will be described with reference to FIG. 3. The settings reception process is executed by the first module 38 of the program 37.

The first module 38 of the program 37 executes the settings reception process when the program 37 is started up or when a user command is received through the user interface 23, for example. Though the first module 38 of the program 37 executes the setting reception process, in the following description, each process is described using expressions, such as "the program 37 executes" for simplicity. In S11 at the beginning of the settings reception process, the program 37 acquires the names of generation programs 29 that are stored in the memory 32. Through programming or settings data, the name of a generation program 29 is set the same as the model name of the printer 11 that the generation program 29 supports. For example, the program 37 inputs a command into the OS 36 requesting the names of generation programs 29 stored in the memory 32, and subsequently acquires the names of generation programs 29 (i.e., model names) returned by the OS 36.

In S12 the program 37 identifies the model names (i.e., names of the generation programs 29) from among the model names acquired in S11 that are types supported by the program 37. Types of generation programs 29 supported by the program 37 are generation programs 29 provided by the vendor of the program 37, for example. In other words, the program 37 identifies model names from among those acquired in S11 that correspond to the names of its own company's generation programs 29.

In S13 the program 37 generates first settings screen data representing a first settings screen. More specifically, the program 37 reads base screen data from the data storage area 35 for generating first settings screen data. The base screen data includes input fields for inputting model names or classes for receiving inputted model names. The program 37 generates the first settings screen data by inputting the model names identified in S12 into the input fields or classes. In S14 the program 37 inputs the first settings screen data generated in S13 into the display 22 to display the first settings screen on the display 22. Hence, the first settings screen displays names of the generation programs 29 supported by the program 37 from among the generation programs 29 stored in the memory 32 of the information-processing device 10.

Figure 6:
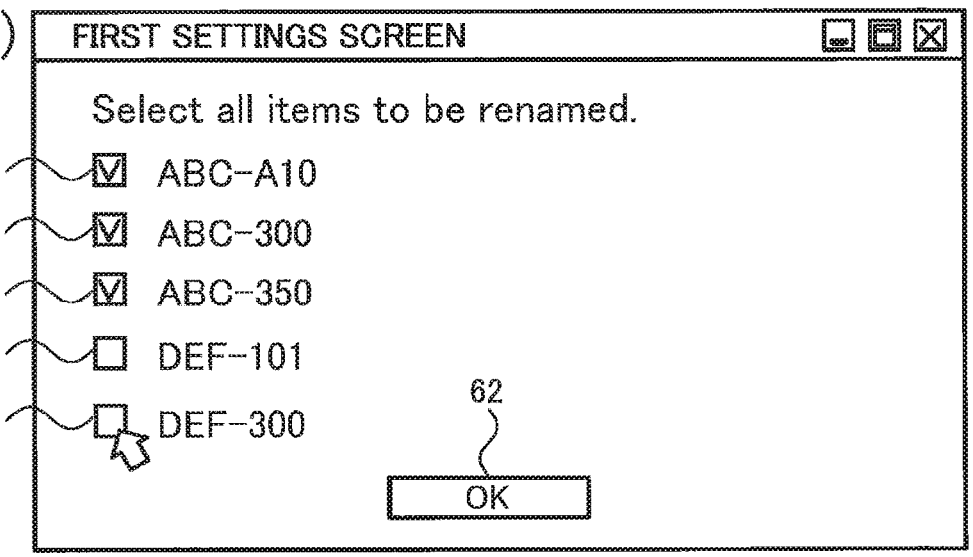
FIGS. 6(A), 6(B), and 6(C) are schematic diagrams respectively illustrating a first settings screen, a second settings screen, and a name entry screen.
Figure 6:
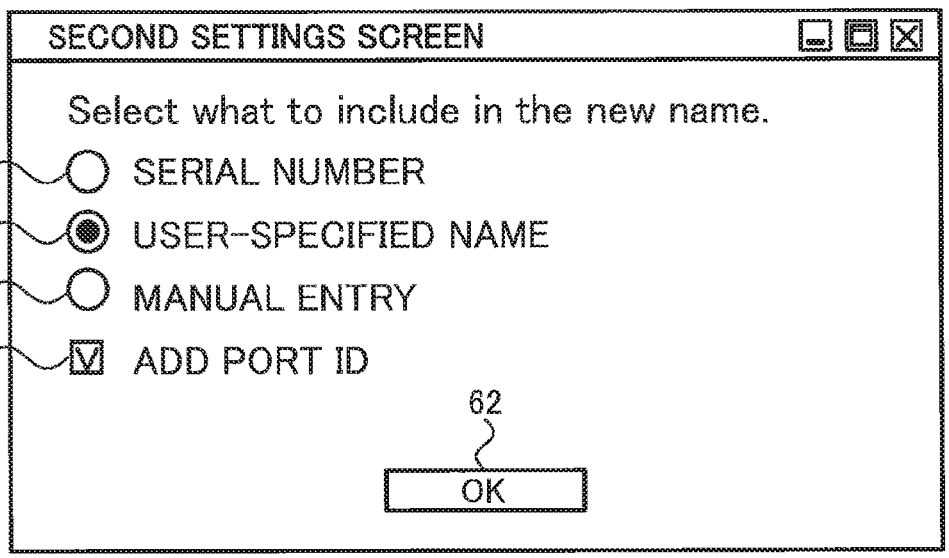
Figure 6:
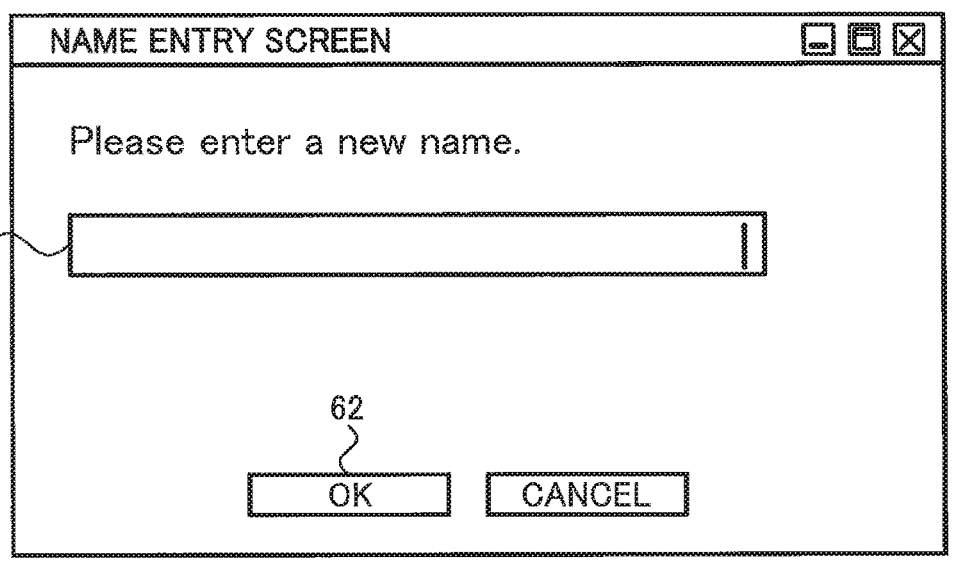

FIG. 6(A) shows an example of the first settings screen. The first settings screen in this example has the text "Select all items to be renamed," a plurality of checkboxes 61, model names displayed to the right of respective checkboxes 61, and an OK icon 62. The user selects model names whose print queue names the user wishes to modify by checking the corresponding checkboxes 61. Here, "renaming" denotes the action of resetting the print queue name.

Figure 3:
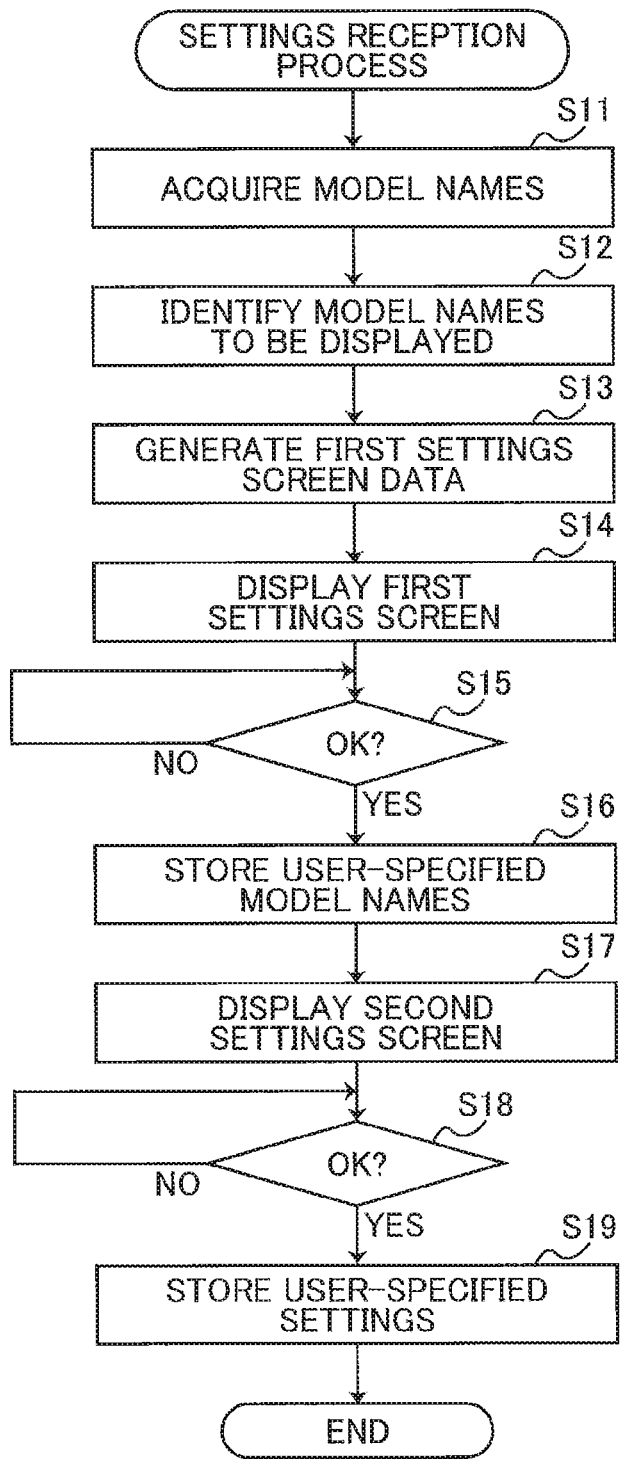
FIG. 3 is a flowchart illustrating a settings reception process.

In S15 of FIG. 3, the program 37 determines whether the OK icon 62 was selected in the first settings screen. The program 37 continues controlling the display 22 to display the first settings screen while the OK icon 62 has not been selected (S15: NO). When the program 37 determines that the OK icon 62 was selected (S15: YES), in S16 the program 37 stores the model names next to selected checkboxes 61 in the data storage area 35 as user-specified model names. The process of S16 is an example of a process for receiving specification.

In S17 the program 37 controls the display 22 to display a second settings screen. Specifically, the program 37 reads second settings screen data representing the second settings screen from the data storage area 35 and inputs the second settings screen data into the display 22 to display the second settings screen on the display 22. The first settings screen and the second settings screen are examples of the input screen.

FIG. 6(B) shows an example of the second settings screen. The second settings screen has the text "Select what to include in the new name," a radio button 63, the text "Serial number" arranged to the right of the radio button 63, a radio button 64, the text "User-specified name" arranged to the right of the radio button 64, a radio button 65, the text "Manual entry" arranged to the right of the radio button 65, a checkbox 66, the text "Add port ID" arranged to the right of the checkbox 66, and the OK icon 62.

The radio button 63 is an object that receives a user instruction to include the serial number in the new name. Here, the new name denotes the modified print queue name. The radio button 64 is an object that receives a user instruction to include a user-specified name in the new name. The user-specified name is a name (a nickname) the user registered on the printer 11 and that is stored in the memory 52 of the printer 11. The radio button 65 is an object that receives a user instruction to receive input for a new name and for modifying the print queue name based on the received new name.

The radio buttons 63, 64, and 65 are objects capable of receiving only a single selection among the three at any one time, for example. However, the radio buttons 63 and 64 may be configured to be simultaneously selectable.

The checkbox 66 is an object that receives a user instruction to further include the port ID in the new name. When the radio button 63 and the checkbox 66 are selected, for example, the serial number and the port ID are both included in the new name. If the radio button 64 and the checkbox 66 are selected, the user-specified name and the port ID are included in the new name. The embodiment describes a case in which the checkbox 66 cannot be selected when the radio button 65 is selected. However, the radio button 65 and the checkbox 66 may be configured to be simultaneously selectable.

In S18 of FIG. 3, the program 37 determines whether the OK icon 62 was selected in the second settings screen and continues displaying the second settings screen on the display 22 while the OK icon 62 has not been selected (S18: NO). When the program 37 determines that the OK icon 62 was selected (S18: YES), in S19 the program 37 stores the user-specified settings in the data storage area 35 of the memory 32, and subsequently ends the settings reception process. User-specified settings is information indicating which of the radio buttons 63, 64, and 65 and checkbox 66 were selected. The user-specified model names and the user-specified settings are examples of operation settings. The steps S16 and S19 in which the program 37 acquires the user-specified model names and the user-specified settings are examples of the settings reception process. The user-specified settings such as the serial number and the user-specified name are examples of renaming type information. The user-specified settings indicating adding the port ID are an example of an option specification. The user-specified settings indicating the manual entry are an example of an input option specification.

Next, a process executed by the program 37 when the OS 36 records a print queue in the registry will be described with reference to FIG. 4(A).

The OS 36 executes the process from S21 to S23 using the PnP function. Specifically, in S21 the OS 36 detects that a printer 11 was newly connected to the port of the information-processing device 10. In S22 the OS 36 acquires the model name and the serial number stored in the memory 52 of the printer 11 through the port to which the printer 11 is connected. For example, the OS 36 transmits a command through the port to which the printer 11 is connected requesting the printer 11 to return the model name and the serial number. Upon receiving the command, the control program 57 of the printer 11 reads the model name and the serial number from the memory 52 and returns the model name and the serial number to the information-processing device 10. The OS 36 of the information-processing device 10 receives the model name and the serial number from the printer 11.

In S23 the OS 36 generates a print queue name based on the model name received in S22 and records a print queue with this print queue mane in the registry. The process of S23 is an example of the first registration process. The OS 36 stores the model name and the serial number acquired from the printer 11 in the print queue recorded in the registry. The OS 36 also generates a port ID distinguishing the port to which the printer 11 is connected from other ports and stores this port ID in the print queue. The OS 36 also identifies the generation program 29 possessing the same name as the model name acquired from the printer 11 from the plurality of generation programs 29 stored in the memory 32, acquires default print settings from the identified generation program 29, and stores the acquired print settings in the print queue. Hence, the print queue correlates the model name and serial number of the printer 11 with the port ID specifying the port to which the printer 11 is connected, the print settings for the printer 11, and the generation program 29. The processes of S21-S23 are executed each time a printer 11 is connected to the port of the information-processing device 10.

Next, print queue names will be described in greater detail with reference to FIGS. 2(A)-2(E). The print queue names are the names of print queues that the OS 36 has recorded in the registry.

First, the print queue name for a first print queue will be described. The first print queue is a print queue that the OS 36 records in the registry under the conditions shown in FIG. 2(A). FIG. 2(A) shows the state when, beginning from a state in which no printers 11 are connected to the information-processing device 10, a printer 11 having the model name "ABC-A01" is connected to the USB port USB01 of the information-processing device 10. In this state, the OS 36 sets the print queue name to the model name of the printer 11. Thus, in this example, the OS 36 sets the print queue name of the first print queue to the model name "ABC-A01" of the printer 11.

Next, the print queue name for a second print queue (1) will be described. The second print queue (1) is a print queue that the OS 36 records in the registry under the conditions shown in FIG. 2(B). FIG. 2(B) shows a state when, beginning from the state shown in FIG. 2(A), the printer 11 having the serial number "0123456" is disconnected from the port USB01, and another printer 11 having the same model name "ABC-A01" and the serial number "7891011" is connected to the port USB01. In this state, the OS 36 sets the print queue name for the second print queue (1) to a name that includes the model name of the printer 11 and the text "copy." In this example, the OS 36 sets the print queue name for the second print queue (1) to "ABC-A01 (copy)." In other words, the first print queue having the print queue name "ABC-A01" and the second print queue (1) having the print queue name "ABC-A01 (copy)" are both recorded in the registry at this time. Note that this state occurs when the IgnoreHWSerNum setting in the OS 36 is "0" or the IgnoreHWSerNum function has not be set up in the OS 36.

Next, the print queue name of a second print queue (2) will be described. The second print queue (2) is a print queue that the OS 36 records in the registry under the conditions shown in FIG. 2(C). FIG. 2(C) shows the state when, beginning from the state shown in FIG. 2(A), the printer 11 is disconnected from port USB01 and the same printer 11 is reconnected to a different USB port having the port name USB02. In this state, the OS 36 sets the print queue name to a name that includes the model name of the printer 11 and the text "copy." In this example, the OS 36 sets the print queue name for the second print queue (2) to "ABC-A01 (copy)." Thus, the first print queue having the print queue name "ABC-A01" and the second print queue (2) having the print queue name "ABC-A01 (copy)" are both recorded in the registry at this time. Note that this state occurs only when the IgnoreHWSerNum setting in the OS 36 is set to "1."

Next, the print queue name for a second print queue (3) will be described. The second print queue (3) is a print queue that the OS 36 records in the registry under the conditions shown in FIG. 2(D). FIG. 2(D) shows the state in which, beginning from the state shown in FIG. 2(A), another printer 11 having the model name "ABC-A01" is connected to the USB port USB03. In this state, the OS 36 sets the print queue name to a name that includes the model name of the printer 11 and the text "copy." In this example, the OS 36 sets the print queue name for the second print queue (3) to "ABC-A01 (copy)." Thus, the first print queue having the print queue name "ABC-A01" and the second print queue (3) having the print queue name "ABC-A01 (copy)" are both recorded in the registry at this time.

Next, the print queue name for a second print queue (4) will be described. The second print queue (4) is a print queue that the OS 36 records in the registry under the conditions shown in FIG. 2(E). FIG. 2(E) shows the state in which, beginning from the state shown in FIG. 2(A), another printer 11 having the model name "ABC-A01" is connected to the BT port BT1. In this state, the OS 36 sets the print queue name to a name that includes the model name of the printer 11 and the text "copy." In this example, the OS 36 sets the print queue name for the second print queue (4) to "ABC-A01 (copy)." Thus, the first print queue having the print queue name "ABC-A01" and the second print queue (4) having the print queue name "ABC-A01 (copy)" are both recorded in the registry at this time.

The first print queue is an example of the first print queue information. The printer 11 identified by the serial number stored in the first print queue is an example of the first printer. The model name stored in the first print queue is an example of the first printer name. The port ID stored in the first print queue is an example of the first port ID. The port specified by the port ID stored in the first print queue is an example of the first port. The print queue name of the first print queue is an example of the first print queue name. The print settings stored in the first print queue is an example of the first print settings.

The second print queues (1)-(4) are examples of the second print queue information. The printer 11 identified by the serial number stored in each second print queue is an example of the second printer. The model name stored in the second print queue is an example of the second printer name. The port ID stored in the second print queue is an example of the second port ID. The port specified by the port ID stored in the second print queue is an example of the second port. The print queue name of the second print queue is an example of the second print queue name. The print settings stored in the second print queue is an example of the second print settings.

Figure 4:
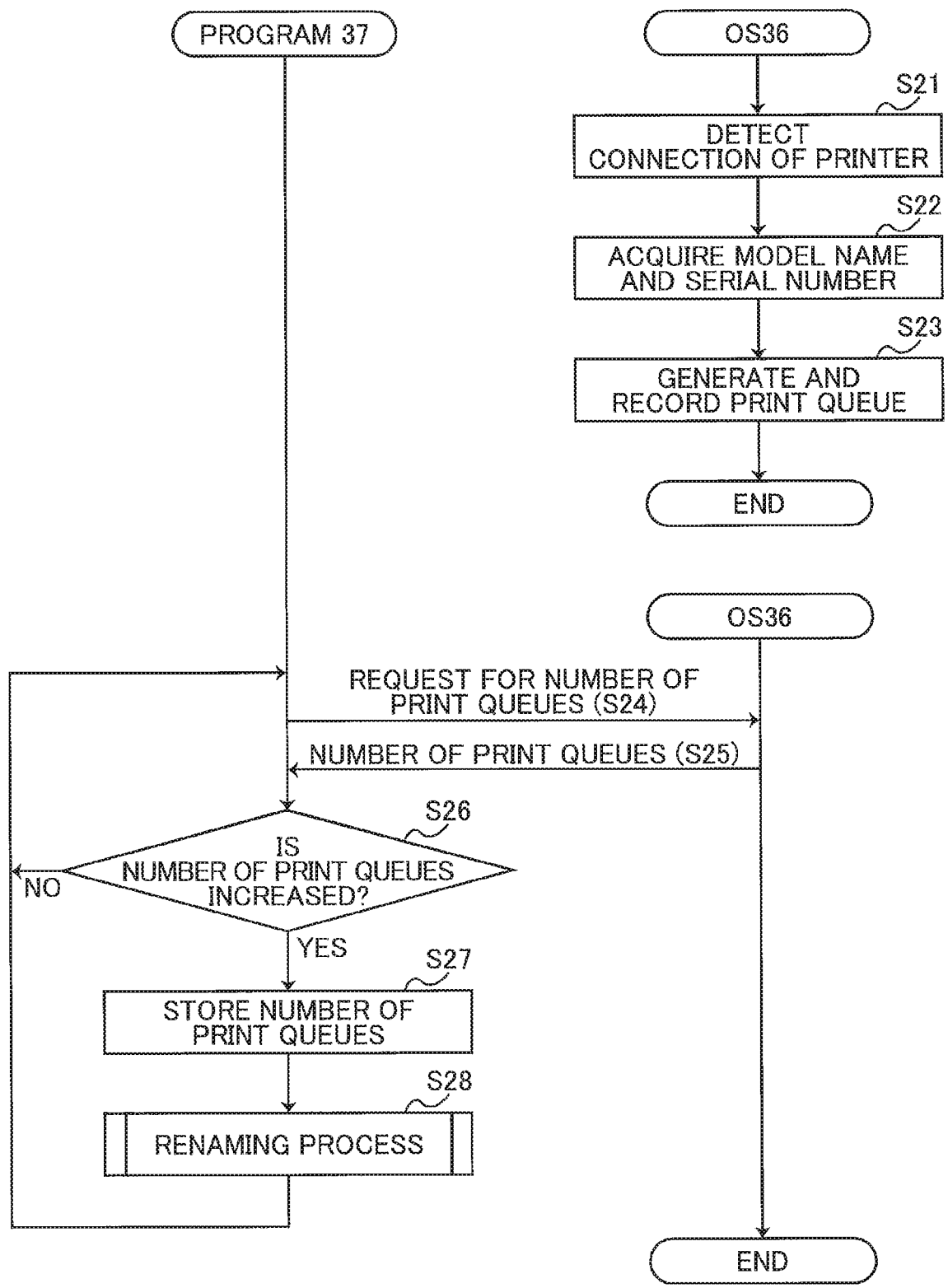
FIG. 4(A) is a flowchart illustrating a process executed by a program and an OS.
FIG. 4(B) is a flowchart illustrating a renaming process.
Figure 4:
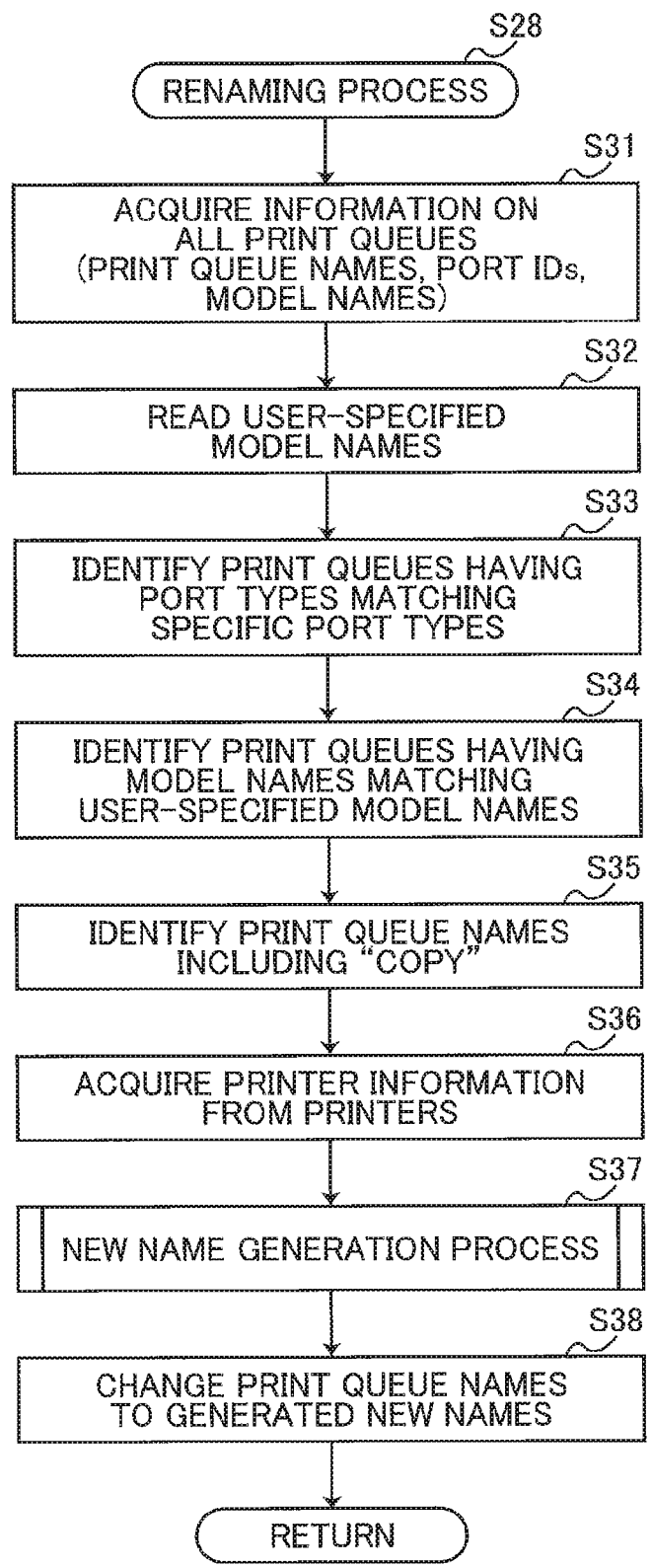

As shown in FIG. 4(A), in S24 the program 37 periodically issues a request to the OS 36 for the number of print queues recorded in the registry. For example, the program 37 inputs a command into the OS 36 requesting the number of print queues each time a preset interval elapses. In S25 the program 37 acquires the number of print queues recorded in the registry from the OS 36 as a response to the request transmitted in S24.

In S26 the program 37 determines whether the number of print queues acquired in S25 (hereinafter called the "current number") is larger than the number of print queues that the OS 36 previously acquired and stored in the memory 32 in step S27 described later (hereinafter called the "previous number"). Hence, the program 37 determines in S26 whether a print queue was newly recorded in the registry during the interval between the time the previous number of print queues was acquired from the OS 36 and the time the current number of print queues was acquired from the OS 36.

If the program 37 determines in S26 that the current number of print queues acquired in S25 is less than or equal to the previous number stored in the memory 32 (S26: NO), the program 37 takes no further action until it is time to issue another request in S24. However, if the program 37 determines that the number of print queues acquired in S25 is greater than the previous number (S26: YES), in S27 the program 37 stores the number acquired in S25 (the current number) in the data storage area 35 of the memory 32. In S28 the program 37 executes the renaming process. The renaming process of S28 is executed by the second module 39 of the program 37. The processes of S24, S25, and S26 are an example of the detection process.

Note that in S26 the program 37 may simply determine whether the current number of print queues acquired in S25 differs from the previous number. Alternatively, in S25 the program 37 may acquire the print queue names rather than the number of print queues. In this case, the program 37 determines in S26 whether the previous print queue names stored in the memory 32 match the current print queue names acquired in S25. The previous print queue names are those names previously acquired from the OS 36 and stored in memory in S27. If the currently acquired print queue names do not match the print queue names stored in the memory 32, in S27 the program 37 stores the currently acquired print queue names in the memory 32, and in S28 executes the renaming process by starting the second module 39. Thus, this process also enables the program 37 to determine when a new print queue has been recorded in the registry and to execute the renaming process in such a case. However, using the number of print queues to determine whether a new print queue has been recorded in the registry can reduce the processing load on the CPU 31 and can shorten the time required to perform the process in steps S25, S26, and S27.

Next, the renaming process will be described in detail with reference to FIG. 4(B). The renaming process is executed by the second module 39 of the program 37. However, in the following description, each process is described using expressions, such as "the program 37 executes" for simplicity. In S31 at the beginning of the renaming process, the program 37 acquires information on all print queues recorded in the registry by reading the print queue name, the port ID, and the model name stored in each print queue. In S32 the program 37 reads the user-specified model names from the memory 32. The user-specified model names were stored in the memory 32 in S16 of the settings reception process (see FIG. 3).

In S33 the program 37 identifies print queues having port types that match its own specific port types. The port types of the print queues are indicated by the port IDs acquired in S31. In other words, in S33 the program 37 identifies print queues generated for printers 11 with which two-way communication is possible. For example, when the information-processing device 10 can only perform two-way communication with printers 11 through USB ports and BT ports, in S33 the program 37 identifies print queues whose port IDs indicate a USB port or a BT port. While not shown in the flowchart, the program 37 ends the renaming process if none of the print queues has a port type that matches one of its own specific port types. The specific port type is an example of the operation settings. The process in which the program 37 acquires the specific port type is an example of the settings reception process.

In S34 the program 37 identifies print queues each having a model name that matches one of the user-specified model names read in S32 from among the print queues identified in S33. The model names of the print queues were acquired in S31. In other words, in S34 the program 37 further identifies print queues generated for printers 11 storing a user-specified model name from among the print queues identified in S33. While not shown in the flowchart, the program 37 ends the renaming process if none of the print queues has a model name matching any of the user-specified model names, i.e., when there are no print queues that are subject to renaming.

In S35 the program 37 identifies print queue names that include the text "copy" from among the print queues identified in S34. In other words, in S35 the program 37 identifies print queues that are subject to renaming. In the examples shown in FIGS. 2(B)-2(E), the second print queues (1)-(4) would be identified as print queues subject to renaming. While not shown in the flowchart, the program 37 ends the renaming process when there are no print queue names that include the text "copy," i.e., when there are no print queues subject to renaming. The text "copy" is an example of the specific name. Also, while not shown in the flowchart, the program 37 eliminates print queues that include a serial number, a user-specified name, or a port ID in the print queue name from the identified print queues. This is because the print queues that include a serial number, a user-specified name, or a port ID in the print queue name indicates that these names were resultant names of the renaming process previously executed. In other words, print queues having a print queue name that was previously renamed in the renaming process are eliminated as subjects for renaming.

In S36 the program 37 communicates with specific printers 11 (i.e., printers corresponding to the identified print queues) using the port IDs and the like in the identified print queues in order to acquire printer information from the specific printers 11. The printer information includes the model name, the serial number, the user-specified name, and the like stored in the memory 52 of the specific printer 11. For example, the program 37 inputs commands into the OS 36 requesting printer information and acquires printer information via the OS 36. The commands inputted into the OS 36 are accompanied with the print queue names and the port IDs. Alternatively, the program 37 may output a command requesting the return of printer information via a port specified by a port ID in each identified print queue in order to acquire printer information. The serial number or the user-specified name that the program 37 acquires from the printer 11 in S36 is an example of the name information.

In S37 the program 37 uses the printer information acquired in S36 to execute a new name generation process on each identified print queue. The new name generation process is executed to generate a new name for the print queue. The new name generation process will be described next with reference to FIG. 5. The new name is an example of a new print queue name.

In S41 (FIG. 5) at the beginning of the new name generation process, the program 37 determines whether the user-specified settings that were stored in the memory 32 in S19 of the settings reception process (see FIG. 3) include the setting "Manual entry." If the program 37 determines that the user-specified settings include the setting "Manual entry" (S41: YES), in S42 the program 37 displays a name entry screen on the display 22 for receiving input of a new name. Specifically, the program 37 reads screen data representing the name entry screen from the memory 32 and inputs this screen data into the display 22.

FIG. 6(C) shows an example of the name entry screen. The name entry screen has the text "Please enter a new name," a textbox 67 for receiving a new name inputted by the user, the OK icon 62, and a Cancel icon. The user inputs a desired name into the textbox 67 using the user interface 23 of the information-processing device 10. After inputting the new name in the textbox 67, the user selects the OK icon 62 using the user interface 23.

Figure 5:
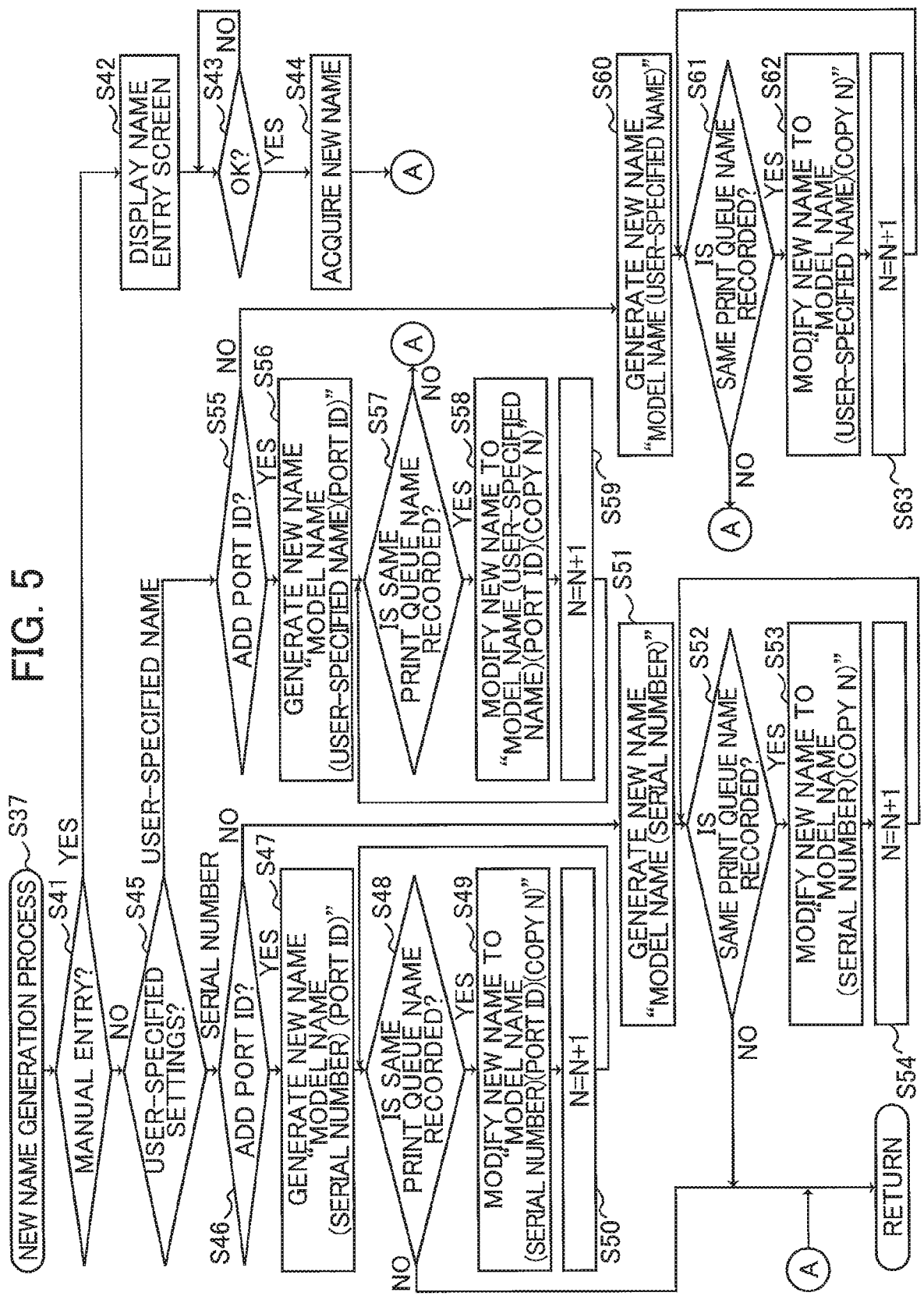
FIG. 5 is a flowchart illustrating a new name generation process.

In S43 of FIG. 5, the program 37 determines whether the OK icon 62 was selected and continually repeats the determination while the OK icon 62 has not been selected (S43:

NO). When the program 37 determines that the OK icon 62 was selected (S43: YES), in S44 the program 37 acquires the new name inputted into the textbox 67 and subsequently ends the new name generation process. The new name that the program 37 acquires in S44 is an example of the name information.

On the other hand, if the program 37 determines in S41 that the user-specified settings do not include "Manual entry" (S41: NO), in S45 the program 37 determines whether the user-specified settings indicate the setting "Serial number" or the setting "User-specified name." If the program 37 determines that the user-specified settings include "Serial number" (S45: serial number), in S46 the program 37 determines whether the user-specified settings indicate the option "Add port ID." If the program 37 determines that the user-specified settings include the option "Add port ID" (S46: YES), in S47 the program 37 generates a new name with the configuration "model name (serial number) (port ID)" using the printer information acquired in S36. Using the second print queue (1) shown in FIG. 2(B) as an example, the program 37 would generate the new name "ABC-A01 (7891011)(USB01)." For the second print queue (2) shown in FIG. 2(C), the program 37 would generate the new name "ABC-A01 (0123456)(USB02)." For the second print queue (3) shown in FIG. 2(D), the program 37 would generate the new name "ABC-A01 (7891011)(USB03)." For the second print queue (4) shown in FIG. 2(E), the program 37 would generate the new name "ABC-A01 (7891011)(BT1)."

In S48 the program 37 determines whether a print queue having the same print queue name as the new name generated in S47 is already recorded in the registry. For example, a print queue having the same name may have already been recorded in the registry during a previously executed new name generation process. In this case, the program 37 determines in S48 that the same name exists in the registry. When the program 37 determines that a print queue having the same name as the new name generated in S47 is already recorded in the registry (S48: YES), in S49 the program 37 modifies the new name generated in S47 to "model name (serial number)(port ID)(copy N)." The initial value of N is "1".

After completing the process in S49, in S50 the program 37 increments the value of N by 1 and repeats the above process from S48. If a print queue having the print queue name "ABC-A01 (7891011)(USB01)(copy 1)" is recorded in the registry (S48: YES), the program 37 may repeat the process in S49 to change the new name from "ABC-A01 (7891011)(USB01)(copy 1)" to "ABC-A01 (7891011)(USB01)(copy 2)." Note that the initial value for N may be "0" instead of "1." When N is "0," the new name is set to "ABC-A01 (7891011)(USB01)(copy)."

When the program 37 determines in S48 that a print queue with the same print queue name as the new name does not exist in the registry (S48: NO), the program 37 ends the new name generation process.

On the other hand, if the program 37 determines in S46 that the user-specified settings do not include the setting "Add port ID" (S46: NO), in S51 the program 37 generates a new name with the construction "model name (serial number)" using the printer information acquired in S36. Based on the second print queue (1) in the example of FIG. 2(B), the program 37 generates the new name "ABC-A01 (7891011)."

After generating the new name in S51, the program 37 executes the process in S52, which is identical to the process in S48 described above. If the program 37 determines in S52 that a print queue having the same print queue name as the new name generated in S51 is not recorded in the registry (S52: NO), the program 37 ends the new name generation process. However, if the program 37 determines that a print queue having the same print queue name as the new name generated in S51 is recorded in the registry (S52: YES), in S53 the program 37 modifies the new name from "ABC-A01 (7891011)" to "ABC-A01 (7891011)(copy 1)", similarly to S49. After executing the process in S53, the program 37 increments N in S54, as in step S50 described above, and repeats the process from S52.

Further, if the program 37 determines in S45 that the user-specified settings indicate the setting "User-specified name" (S45: user-specified name), in S55 the program 37 determines whether the user-specified settings indicate the option "Add port ID." If the program 37 determines that the user-specified settings indicate "Add port ID" (S55: YES), in S56 the program 37 generates a new name having the configuration "model name (user-specified name)(port ID)" using the printer information acquired in S36. Based on the second print queue (2) shown in the example of FIG. 2(C), the program 37 would generate the new name "ABC-A01 (Office)(USB02)." While not shown in the flowchart, if a user-specified name could not be acquired because a name is not stored in the memory 52 of the printer 11, the program 37 may display an error screen on the display 22 indicating that a user-specified name has not been set for the printer 11, for example.

After generating the new name in S56, the program 37 executes the process in S57, which is identical to the process in S48 described above. If the program 37 determines in S57 that a print queue having the same print queue name as the new name generated in S56 is not recorded in the registry (S57: NO), the program 37 ends the new name generation process. However, if a print queue having the same name as the new name generated in S56 already exists in the registry (S57: YES), in S58 the program 37 modifies the new name to "model name (user-specified name)(port ID)(copy N)", similarly to S49. Using the example shown in FIG. 2(C), in S58 the program 37 would modify the new name from "ABC-A01 (Office)(USB02)" to "ABC-A01 (Office)(USB02)(copy 1)." After completing the process in S58, in S59 the program 37 increments N by 1, as described in step S50, and subsequently repeats the process from S57.

On the other hand, if the program 37 determines in S55 that the user-specified settings do not indicate the option "Add port ID" (S55: NO), in S60 the program 37 generates a new name having the configuration "model name (user-specified name)" using the printer information acquired in S36. For the second print queue (2) shown in the example of FIG. 2(C), the program 37 would generate the new name "ABC-A01 (Office)."

After generating the new name in S60, the program 37 executes the process in S61, which is identical to the process in S48 described above. If the program 37 determines in S61 that a print queue having the same print queue name as the new name generated in S60 is not recorded in the registry (S61: NO), the program 37 ends the new name generation process. However, if the program 37 determines that a print queue having the same print queue name as the new name exists in the registry (S61: YES), in S62 the program 37 modifies the new name to "model name (user-specified name)(copy N)", similarly to S49. Using the example shown in FIG. 2(C), the program 37 would modify the new name from "ABC-A01 (Office)" to "ABC-A01 (Office)(copy 1)." After completing the process in S62, in S63 the program 37 increments N by 1, as in the process of S50 described above, and repeats the process from S61.

After completing the new name generation process in S37 of FIG. 4(B) for each identified print queue, in S38 the program 37 changes the print queue names of the print queues identified in S35 to the new names generated in the new name generation process, and subsequently ends the renaming process. The process of S38 is an example of a name modification process. Upon completing the renaming process in S28 of FIG. 4(A), the process of FIG. 4(A) ends.

Effects of the Embodiment

When a print queue having a print queue name that contains "copy" is newly recorded in the registry (S26: YES), the program 37 identifies the print queue (S35), generates a new name (S37), and changes the print queue name of the identified print queue to the new name (S38). Accordingly, the program 37 can reduce the chance of a user selecting the wrong print queue in the selection screen displayed for selecting print queues.

The program 37 also receives input of user-specified model names (S16) and targets for renaming only those print queues with a print queue name that includes a model name matching one of the user-specified model names. Hence, the program 37 changes the print queue name of a print queue generated for a printer 11 having a model name specified by the user. Accordingly, the program 37 changes only print queue names for print queues generated for printers 11 having model names specified by the user.

When the second print queue (3) shown in FIG. 2(D) is recorded in the registry, the program 37 detects that a print queue subject to renaming has been recorded in the registry (S26, S35) and changes the print queue name of the detected second print queue (3) to the new name generated in the new name generation process (S38). Accordingly, the program 37 can change the print queue name for the second print queue (3) generated when a printer 11 different from a printer 11 connected to a first port is connected to another port, to a suitable new name.

When the second print queue (2) shown in FIG. 2(C) is recorded in the registry, the program 37 changes the print queue name of the second print queue (2) to a new name generated in the new name generation process (S38). Accordingly, the program 37 can change the print queue name for the second print queue (2), which was generated when the printer 11 connected to one port was disconnected and reconnected to another port, to a suitable new name.

The program 37 acquires the number of print queues recorded in the registry (S25) and, if the acquired number is greater than the previous number (i.e., the previously acquired number of print queues; S26: YES), the program 37 reads the print queue names from the memory 32 (S31). Hence, the program 37 can detect when a print queue subject to the renaming process has been recorded in the registry, without always reading the print queue names from the memory 32. As a result, the program 37 can reduce processing load on the CPU 31.

The program 37 receives model names specified by the user (S16), identifies print queues having print queue names that include the received model names (S34), and changes the print queue names for the identified print queues to new names generated in the new name generation process (S38). Hence, the program 37 changes only print queue names of print queues generated for printers 11 having model names specified by the user. As a result, the program 37 can reduce the processing load on the CPU 31 and can change the print queue names of print queues generated for printers 11 having model names specified by the user.

The program 37 generates a new name that includes the serial number of the printer 11 when receiving the user-specified setting "Serial number" and generates a new name that includes a user-specified name for the printer 11 when receiving the user-specified setting "User-specified name." Hence, the program 37 can change print queue names to new names that include the name of a user-specified type.

In addition to a serial number or a user-specified name, the program 37 generates a new name that also includes a port ID when having received the user-specified setting "Add port ID." The user can differentiate print queues according to the text "USB" or "BT" included in the print queue name. Therefore, by including the port ID in the new name, the program 37 can facilitate the user in selecting a print queue in the selection screen.

In the new name generation process, the program 37 displays a name entry screen on the display 22 for receiving input of a new name (S42) after having received the user-specified setting "Manual entry." Therefore, the program 37 allows the user to select whether to input a new name manually. The program 37 can also change the print queue name to the new name inputted by the user.

The program 37 communicates with the printer 11 to acquire the user-specified name and the serial number (S36). Therefore, the program 37 can include the user-specified name or the like in the new name, even when the user-specified name or the like is not stored in the print queue.

First Variation

In the example described in the embodiment, the program 37 periodically acquires the number of print queues recorded in the registry and, when the acquired number exceeds the previously acquired number (S26: YES), the program 37 acquires the print queue names (S31) and determines whether any of the acquired print queue names include the text "copy" (S35). However, in place of the process described in S24-S27, the program 37 may execute a process to periodically acquire print queue names, port IDs, and model names and periodically execute the renaming process (S28). This variation still enables the program 37 to detect whether a print queue subject to the renaming process has been recorded in the registry.

Second Variation

The embodiment describes a case in which the program 37 has specific port types. However, the program 37 may possess correlation information, such as a table, that correlates model names with specific port types. The correlation information indicates the types of ports with which a printer 11 having a prescribed model name can perform two-way communication. The correlation information may be stored in the memory 32.

In this variation, the program 37 identifies specific port types in the correlation information that are correlated with the model names acquired in S31. Next, the program 37 identifies print queues acquired in S31 whose port types specified by their port IDs match the specific port types identified in the correlation information. That is, each print queue identified in S31 has a port type and a model name which match one correlation in in the correlation information. In other words, the program 37 identifies printers 11 having the model names acquired in S31 that can perform two-way communication and in S33 identifies the print queues generated for those identified printers 11 as print queues subject to renaming.

This variation can suitably rename print queues even when the types of ports that allow two-way communication differ by model.

Other Variations

The embodiment describes a case in which the program 37 communicates with the printer 11 to acquire the model name, the serial number, and the user-specified name for the printer 11. However, if the user-specified settings include "Serial number" and "Add port ID," the program 37 may read the serial number and the port ID stored in the print queue without communicating with the printer 11. Further, if the user-specified settings include "Manual entry," the program 37 may skip the process in S36 for communicating with the printer 11 to acquire the model name, the serial number, and the user-specified name. These variations eliminate the time required for communicating with the printer 11, resulting in a faster processing speed for the renaming process.

In the example described in the embodiment, the second module 39 (the renaming process) is started when a new print queue is recorded in the registry. However, the second module 39 may be started directly in response to a user command. For example, when the print queue name for a print queue recorded in the registry has been modified, the user may start the second module 39 to execute the renaming process. By providing the program 37 with the first module 38 and the second module 39, the program 37 can execute the renaming process when a new print queue is recorded in the registry and can also execute the renaming process in response to a user command.

The embodiment describes a case in which the program 37 generates a new name that includes a user-specified name after receiving the user-specified setting "User-specified name." However, the program 37 may always include the user-specified name when generating a new name if a user-specified name was acquired from the printer 11. In this case, the program 37 generates a new name that includes the serial number when a user-specified name was not acquired. Additionally, the process for receiving the user-specified settings "User-specified name" and "Serial number" may be omitted.

The embodiment describes a case in which the program 37 receives a user specification indicating whether to include characters, such as "USB" or "BT", in the new name that indicate the type of port to which the printer 11 is connected. However, the program 37 may always include characters in the new name indicating the type of port to which the printer 11 is connected without receiving a user specification.

The embodiment describes a case in which only one of the radio buttons 63 and 64 (FIG. 6(B)) is selectable. However, a configuration in which both the radio buttons 63 and 64 are simultaneously selectable is also possible. In this case, the new name generated in the new name generation process has a configuration such as "model name (serial number)(user-specified name)" or "model name (serial number)(user-specified name)(port ID)."

The embodiment describes a case in which the new name includes the port ID. However, the new name may include only the port type specified by the port ID rather than the port ID itself. Specifically, the new name may include a port type, such as "USB" or "BT", rather than a port ID, such as "USB01" or "BT1."

The embodiment describes a case in which the user-specified settings are "Serial number," "User-specified name," and "Add port ID." However, the program 37 may be capable of accepting other user-specified settings, provided that the user-specified settings include settings by which the user can identify the printer 11.

The embodiment describes a case in which the program 37 targets for renaming print queues generated for printers 11 capable of two-way communication. However, the program 37 may also target for renaming print queues generated for printers 11 not capable of two-way communication. In this case, the program 37 generates a new name that includes information stored in the print queue, or a name the user inputs manually.

What is claimed is:

1. A non-transitory computer readable storage medium storing a set of program instructions installed on and executed by an information-processing device having a display, a plurality of physical ports including a first physical port, a controller and a memory storing an OS, the OS being configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS, the OS being configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name, the set of program instructions comprising:

executing a detection process, after first print queue information is registered, to detect that second print queue information is registered on the memory, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name being based on the first printer name and different from the first print queue name; and executing a renaming process, in response to detection of the second print queue registered, to modify the second print queue name in the second print queue information.

2. The non-transitory computer readable storage medium according to claim 1, wherein the plurality of physical ports further includes a second physical port different from the first physical port, wherein the second print queue information is registered for a second printer connected to the second physical port, the second printer being different from the first printer but having the same name of the first printer, the second port ID identifying the second physical port, wherein the renaming process includes:
acquiring name information to differentiate the second print queue information from the first print queue information;
generating a new print queue name based on the name information; and modifying the second print queue name to the new print queue name.

3. The non-transitory computer readable storage medium according to claim 1, wherein the plurality of physical ports further includes a second physical port different from the first physical port,
wherein the second print queue information is registered for the first printer which is disconnected from the first physical port and then newly connected to the second physical port, the second port ID identifying the second physical port,
wherein, the renaming process includes:
acquiring name information to differentiate the second print queue information from the first print queue information;
generating a new print queue name based on the name information; and
modifying the second print queue name to the new print queue name.

4. The non-transitory computer readable storage medium according to claim 1, wherein the detection process includes:
repeatedly acquiring number of print queue names registered in the memory;
determining whether a currently acquired number is larger than a previously acquired number; and
acquiring each print queue name registered in the memory in response to determining that the currently acquired number is larger than the previously acquired number; and
identifying the second print queue information, as a target of the renaming process, based on the acquired print queue name.

5. The non-transitory computer readable storage medium according to claim 1, wherein the detection process includes:
acquiring a print queue name included in each print queue information registered in the memory; and
determining whether the acquired print queue name includes a specific name,
wherein the renaming process on the second print queue name is executed in a case where the second print queue name includes the specific name.

6. The non-transitory computer readable storage medium according to claim 1, wherein the set of program instructions further comprises:
receiving selection of a printer name; and
determining whether the second print queue name includes the selected printer name,
wherein the renaming process on the second print queue name is executed in a case where the second print queue name includes the selected printer name.

7. The non-transitory computer readable storage medium according to claim 6, wherein the set of program instructions further comprises:
acquiring correlation information correlating a port type with a printer name;
specifying a port type of the second port ID;
specifying a port type correlated with the selected printer name from the correlation information;
determining whether the port type of be second port ID matches the port type correlated with the selected printer name,
wherein the renaming process on the second print queue name is executed in a case where the port type of the second port ID matches the port type correlated with the selected printer name.

8. The non-transitory computer readable storage medium according to claim 1, wherein the set of program instructions further comprises receiving specification of name type information indicating a name type,
wherein the renaming process includes:
acquiring name information related to the name type which is specified;
generating a new print queue name based on the acquired name information; and
modifying the second print queue name to the new print queue name.

9. The non-transitory computer readable storage medium according to claim 1, wherein the set of program instructions further comprises acquiring port information which is one of the second port ID included in the second print queue information registered in the memory and a port type indicated by the second port ID,
wherein the renaming process includes:
generating a new print queue name including the acquired port information; and
modifying the second print queue name to the new print queue name.

10. The non-transitory computer readable storage medium according to claim 9, wherein the set of program instructions further comprises receiving selection as to whether the second print queue name is modified to the new print name including the port information or not,
wherein the new print queue name including the acquired port information is generated based on reception of selecting that the second print queue name is modified to the new print name including the port information.

11. The non-transitory computer readable storage medium according to claim 1, wherein the set of program instructions further comprises receiving selection as to whether to receive input of the new print queue name,
wherein the renaming process further includes:
receiving input of the new print queue name in a case where selection to receive input of the new print queue name is received,
wherein the second print queue name is modified to the inputted new print queue name.

12. The non-transitory computer readable storage medium according to claim 1, wherein the renaming process includes:
communicating with a printer connected to a second port identified by the second port ID and acquiring name information from the printer;
generating a new print queue name including the acquired name information; and
modifying the second print queue name to the new print queue name.

13. The non-transitory computer readable storage medium according to claim 1, wherein the renaming process includes:
generating a new print queue name based on the second print queue information; and
modifying the second print queue name to the new print queue name.

14. The non-transitory computer readable storage medium according to claim 1, wherein the set of program instructions includes a first module and a second module,
wherein the first module comprises executing displaying an input screen on the display to receive settings and receiving the settings through the input screen,
wherein the second module comprises executing the renaming process.

15. The non-transitory computer readable storage medium according to claim 1, wherein the plurality of physical ports includes a port conforming to USB standard.

16. The non-transitory computer readable storage medium according to claim 1, wherein the plurality of physical ports includes a Bluetooth port conforming to Bluetooth standard.

17. The non-transitory computer readable storage medium according to claim 16, wherein the Bluetooth port conforms to Hardcopy Cable Replacement Profile.

18. The non-transitory computer readable storage medium according to claim 1, wherein the registration process includes:
  detecting the printer connected to the information-processing device in a communicable manner, the printer name being acquired from the connected printer,
  generating the port ID; and
  generating the print queue information correlating the acquired printer name with the generated port ID.

19. A non-transitory computer readable storage medium storing a set of program instructions installed on and executed by an information-processing device having a display, a plurality of physical ports including a first physical port, a controller and a memory storing an OS, the OS being configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS, the OS being configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name, the set of program instructions comprising:
  executing a settings reception process to receive operation settings; and
  executing a renaming process, after first print queue information and second print queue information are registered, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name including at least part of the first print queue name, the renaming process being to modify the second print queue name.

20. The non-transitory computer readable storage medium according to claim 19, wherein the plurality of physical ports further includes a second physical port different from the first physical port,
  wherein the first print queue information is registered for the first printer connected to the first physical port,
  wherein the second print queue information is registered for a second printer connected to the second physical port, the second printer different from the first printer, the second port ID identifying the second physical port.

21. The non-transitory computer readable storage medium according to claim 19, wherein the plurality of physical ports further includes a second physical port different from the first physical port,
  wherein the first print queue information is registered for the first printer connected to the first physical port,
  wherein the second print queue information is registered for the first printer which is newly connected to the second physical port, the second port ID identifying the second physical port.

22. The non-transitory computer readable storage medium according to claim 19, wherein the set of program instructions further comprises:
  receiving selection of a printer name; and
  determining whether the second print queue name includes the selected printer name,
  wherein the renaming process on the second print queue name is executed in a case where the second print queue name includes the selected printer name.

23. The non-transitory computer readable storage medium according to claim 19, wherein the set of program instructions further comprises:
  acquiring correlation information correlating a port type with a printer name;
  specifying a port type of the second port ID;
  specifying a port type correlated with the selected printer name from the correlation information;
  determining whether the port type of the second port ID matches the port type correlated with the selected printer name,
  wherein the renaming process on the second print queue name is executed in a case where the port type of the second port ID matches the port type correlated with the selected printer name.

24. The non-transitory computer readable storage medium according to claim 19, wherein the set of program instructions further comprises receiving specification of name type information indicating a name type,
  wherein the renaming process includes:
    acquiring name information related to the name type which is specified;
    generating a new print queue name based on the acquired name information; and
    modifying the second print queue name to the new print queue name.

25. The non-transitory computer readable storage medium according to claim 19, wherein the set of program instructions further comprises acquiring port information which is one of the second port ID included in the second print queue information registered in the memory and a port type indicated by the second port ID,
  wherein the renaming process includes:
    generating a new print queue name including the acquired port information; and
    modifying the second print queue name to the new print queue name.

26. The non-transitory computer readable storage medium according to claim 25, wherein the set of program instructions further comprises receiving selection as to whether the second print queue name is modified to the new print name including the port information or not,
  wherein the new print queue name including the acquired port information is generated based on reception of selecting that the second print queue name is modified to the new print name including the port information.

27. The non-transitory computer readable storage medium according to claim 19, wherein the set of program instructions further comprises receiving selection as to whether to receive input of the new print queue name,
wherein the renaming process further includes:
receiving input of the new print queue name in a case where selection to receive input of the new print queue name is received,
wherein the second print queue name is modified to the inputted new print queue name.

28. The non-transitory computer readable storage medium according to claim 19, wherein the renaming process includes:
communicating with a printer connected to a second port identified by the second port ID and acquiring name information from the printer;
generating a new print queue name including the acquired name information; and
modifying the second print queue name to the new print queue name.

29. The non-transitory computer readable storage medium according to claim 19, wherein the renaming process includes:
generating a new print queue name based on the second print queue information; and
modifying the second print queue name to the new print queue name.

30. The non-transitory computer readable storage medium according to claim 19, wherein the set of program instructions includes a first module and a second module,
wherein the first module comprises executing displaying an input screen on the display to receive settings and receiving the settings through the input screen,
wherein the second module comprises executing the renaming process.

31. The non-transitory computer readable storage medium according to claim 19, wherein the plurality of physical ports includes a port conforming to USB standard.

32. The non-transitory computer readable storage medium according to claim 19, wherein the plurality of physical ports includes a Bluetooth port conforming to Bluetooth standard.

33. The non-transitory computer readable storage medium according to claim 32, wherein the Bluetooth port conforms to Hardcopy Cable Replacement Profile.

34. The non-transitory computer readable storage medium according to claim 19, wherein the registration process includes:
detecting the printer connected to the information-processing device in a communicable manner, the printer name being acquired from the connected printer,
generating the port ID; and
generating the print queue information correlating the acquired printer name with the generated port ID.

35. An information-processing device comprising:
a display;
a plurality of physical ports including a first physical port;
a memory storing an OS, the OS being configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS, the OS being configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name; and
a controller configured to execute:
a detection process, after first print queue information is registered, to detect that second print queue information is registered on the memory, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name being based on the first printer name and different from the first print queue name; and
a renaming process, in response to detection of the second print queue registered, to modify the second print queue name in the second print queue information.

36. An information-processing device comprising:
a display;
a plurality of physical ports including a first physical port;
a memory storing an OS, the OS being configured to execute: acquiring a printer name of a printer connected to one of the plurality of physical ports; generating a print queue name based on the acquired printer name; and a registration process to register in the memory print queue information correlating the generated print queue name, print settings, and a port ID identifying the physical port connected to the printer with one another, the memory being further configured to store an application program for executing: displaying on the display a selection screen having one or more registered print queue names to be selected; and, in response to selection of a print queue name, outputting a print command for specifying print queue information of the selected print queue name to the OS, the OS being configured to execute, in response to reception of the print command, outputting a print execution command to a printer via a physical port connected thereto whose port ID is correlated with the selected print queue name in the print queue information specified by the print command, the execution command commanding the printer to execute print operation based on print settings of the print queue information of the selected print queue name; and
a controller configured to execute:
a settings reception process to receive operation settings; and
a renaming process, after first print queue information and second print queue information are registered, the first print queue information correlating first print queue name, first print settings, and a first port ID with one another, the first print queue name being based on a first printer name of a first printer connected to a first port, the first port ID identifying the first port, the second print queue information correlating second print queue name, second print settings, and a second port ID with one another, the second print queue name including at least part of the first print queue name, the renaming process being to modify the second print queue name.

* * * * *

UNITED STATES PATENT AND TRADEMARK OFFICE
CERTIFICATE OF CORRECTION

PATENT NO. : 11,334,301 B2
APPLICATION NO. : 17/001101
DATED : May 17, 2022
INVENTOR(S) : Po Chun Chew Page 1 of 1

It is certified that error appears in the above-identified patent and that said Letters Patent is hereby corrected as shown below:

On the Title Page

1) Item (57), ABSTRACT, Line 14, is corrected to add the term "information" before the term "registered" immediately after the phrase "the second print queue"

In the Claims

2) Column 22, Line 50, in Claim 1, is corrected to add the term "information" before the term "registered" immediately after the phrase "the second print queue"

3) Column 28, Line 31, in Claim 35, is corrected to add the term "information" before the term "registered" immediately after the phrase "the second print queue"

Signed and Sealed this
Twenty-eighth Day of February, 2023

Katherine Kelly Vidal
*Director of the United States Patent and Trademark Office*